United States Patent

Boyer

[15] 3,656,705

[45] Apr. 18, 1972

[54] TAPE TRANSPORT ASSEMBLY

[72] Inventor: George Wesley Boyer, Covina, Calif.

[73] Assignee: Leach Corporation, Pasadena, Calif.

[22] Filed: Dec. 26, 1968

[21] Appl. No.: 787,038

[52] U.S. Cl. ..............................242/199, 242/192, 242/200, 274/11 E

[51] Int. Cl. ....................................G11b 15/32, G11b 23/04

[58] Field of Search .........................242/192, 198, 199, 200; 274/11 E

[56] References Cited

UNITED STATES PATENTS

| | | | |
|---|---|---|---|
| 2,821,576 | 1/1958 | Gaubert | 274/11 E |
| 3,196,214 | 7/1965 | Knoth | 242/199 X |
| 3,207,453 | 9/1965 | Kilburg | 242/199 |
| 3,291,409 | 12/1966 | McClellan | 242/198 X |
| 3,348,786 | 10/1967 | Miller et al. | 242/200 |
| 3,381,910 | 5/1968 | Fundingsland | 242/198 X |

*Primary Examiner*—John Petrakes
*Attorney*—Jackson & Jones

[57] ABSTRACT

The disclosure describes a tape transport assembly that is capable of receiving a plurality of tape cartridges for sequentially operating each cartridge to provide a long period of uninterrupted recording time.

11 Claims, 3 Drawing Figures

INVENTOR.
GEORGE WESLEY BOYER
BY Jackson + Jones
ATTORNEYS

TAPE TRANSPORT ASSEMBLY

BACKGROUND OF THE INVENTION

1. Field of the Invention

This invention relates to tape recording systems and more particularly to tape transport assemblies utilized to receive tape cartridges.

2. Description of the Prior Art

In a magnetic tape recording system the supply reel of magnetic tape is usually inserted into the system with the magnetic tape being unwound from the supply reel, drawn through capstan and magnetic head assemblies and wound onto a take-up reel. The problem with many systems is that the tapes are difficult to manipulate because they must be threaded through a plurality of guides, leading the tape from the supply reel, through the aforementioned assemblies and onto the take-up reel. Such a threading operation is complex and time-consuming with a high probability of errors being made. In many systems the work area is guite small and gaining access to these guides is difficult.

This problem has been overcome with the advent of the tape cartridge. The tape cartridge is a completely self-contained unit which houses the supply and take-up reels along with guide means to expose the tape to capstan and magnetic head assemblies. In operation the cartridge is inserted as a unit into a compartment formed in the tape transport assembly, with the exposed tape frictionally engaging the capstan and magnetic head assemblies. At no time is it necessary for the user to manipulate the tape. This makes such operations simple and convenient, while the possibility of errors caused by improper threading are eliminated. Such systems have largely been used in automobile tape decks, miniature tape recorders and other systems where tape threading would be impractical.

Heretofore, tape transports that are adapted to receive such tape cartridges usually comprised tape driving means which included one or more rotating capstans for frictionally driving the magnetic tape across the magnetic head assembly. The tape transports also included means for rotatably driving the take-up reel of the cartridge, and means for rotatably driving the supply reel in the opposite direction for rewinding purposes.

However, prior tape transport systems have been able to utilize only single tape cartridges and have been limited as to the amount of recording time they can provide. The recording time, of course, depends on the amount of tape on the supply reel and the tape speed. The large 7-inch reels, being driven at normal speeds, are able to record for 6 hours. However, there are many instances where a longer recording time is required. One such example is in the airport control towers which must record continuously for 24-hour periods. In such a case it would be quite burdensome to be required to change the recording tapes every four to 6 hours. There are many other such monitoring systems that must record over a long period of time. In such cases the frequent changing of the tape cartridges would be impractical, inconvenient and time-consuming.

SUMMARY OF THE INVENTION

This invention obviates the problems encountered by prior devices by providing a tape transport assembly for receiving a plurality of tape cartridges. The tape transport assembly includes a rectangular compartment being open at the forward end for receiving the tape cartridges. The rearward end of the compartment includes a pair of rotating capstans extending across the compartment with a magnetic head assembly located between the capstans. A plurality of latch mechanisms extend across the compartment with each latch mechanism including a pivoting pawl adapted to engage a registering tape cartridge. Each latch mechanism further includes a servo motor for pivoting the pawl to move the tape cartridge rearwardly into frictional engagement with the rotating capstans and magnetic head assembly.

Finally, control means are provided to selectively actuate the servo motors.

Thus the invention fulfills a primary object by providing a tape transport assembly that is able to selectively operate a plurality of tape cartridges to provide a long period of uninterrupted recording time.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figure 1:
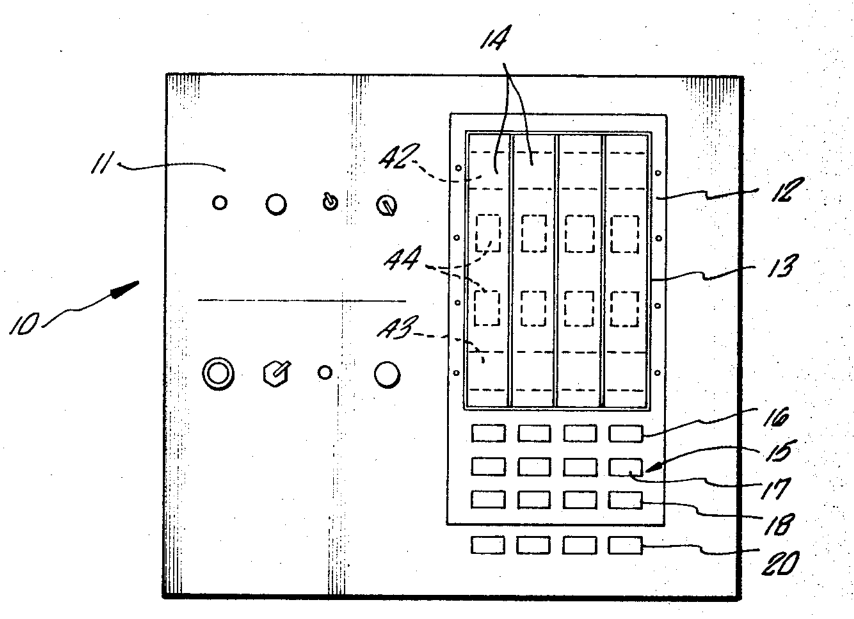
FIG. 1 is a front plan view of a tape recorder having a tape transport system in accordance with the invention.

Referring to the drawings, FIG. 1 shows a tape recorder generally indicated at 10 which includes a control panel assembly 11 and a tape transport assembly 12. The control panel assembly 11 is mounted on the front of the chassis of the tape recorder 10 and contains all the controls necessary for starting and stopping the recorder and for monitoring of the signal. The tape transport assembly 12 is located in the inside right-hand section of the chassis. An opening 13 is provided in the front of the control panel assembly 11 to receive a plurality of tape cartridges 14 into the tape transport assembly 12. The tape transport assembly 12 can accept from one to four tape cartridges at any one time. The cartridge controls, generally indicated at 15, are located directly below the cartridge opening 13 on the control panel 11. The top row of the cartridge controls 15 include a plurality of signals 16 which indicate when its respective tape cartridge is in the recording cycle. The second row of the cartridge controls 15 includes a plurality of signals 17 which indicate when the respective tape cartridge is in the rewind cycle. The bottom row of the cartridge controls 15 includes a plurality of push buttons 18 which are utilized to place the respective tape cartridges in a ready condition. Only those cartridges 14 that are selected by the ready button 18 will be activated.

Located beneath the cartridge controls 15 is a plurality of release buttons 20 which are utilized to unlock the respective tape cartridges 14 when it is desired to remove the respective tape cartridge 14 from the tape transport assembly 12.

Figure 2:
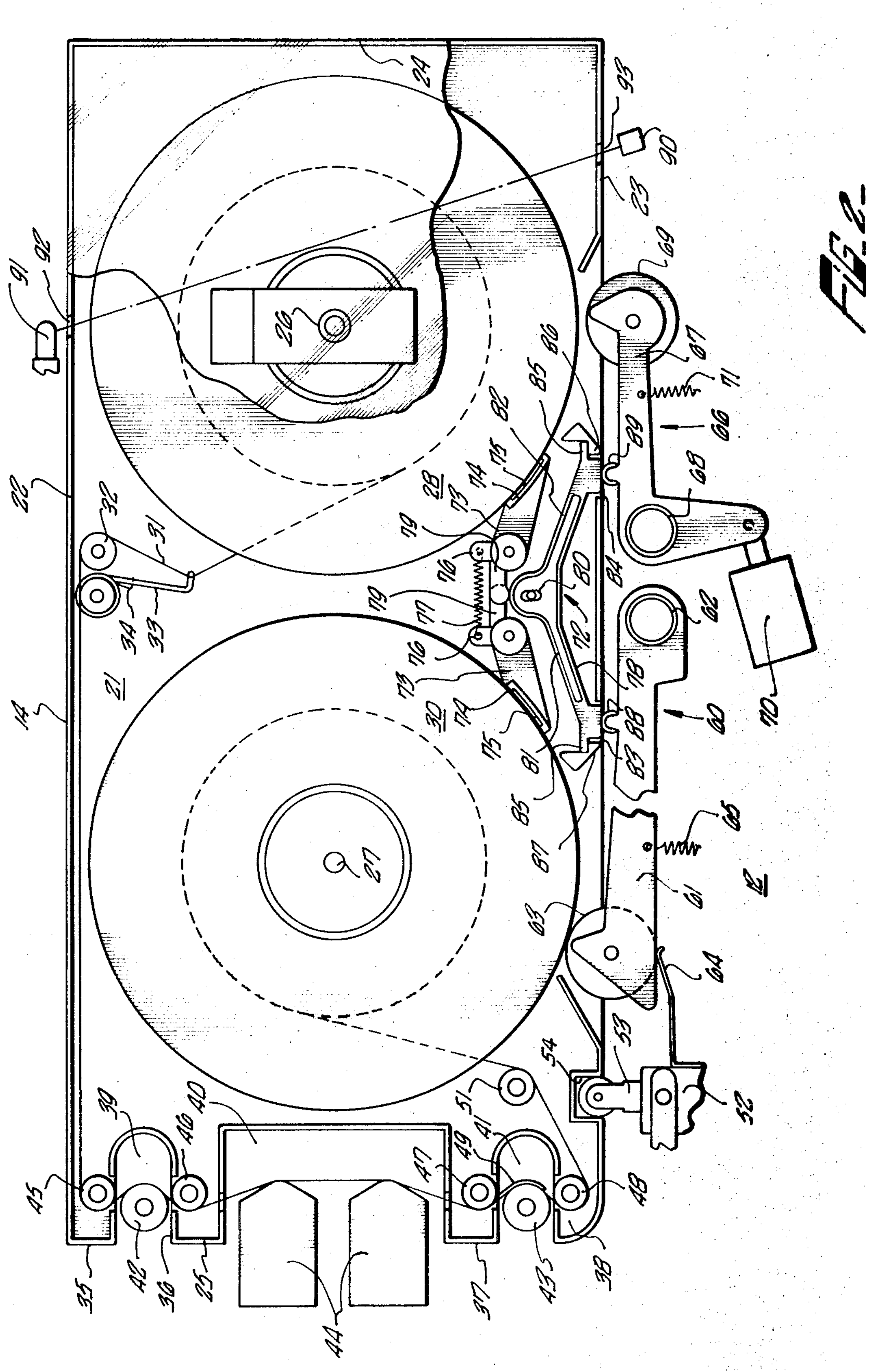
FIG. 2 is a side plan view of a tape cartridge located within the tape transport assembly.

FIG. 2 shows one of the tape cartridges 14 being inserted within the tape transport assembly 12, and is shown in its recording position. The tape cartridge 14 is a rectanglular housing which includes a side wall 21 adjoining top and bottom walls 22 and 23 and forward and rear walls 24 and 25. A pair of spools 26 and 27 are connected to the side wall 21 for receiving a supply reel 28 and a take-up reel 30, respectively. The reels 28 and 30 are conventional and may be purchased commercially. The supply reel 28, located on the front half of the housing, has a magnetic tape 31 wound thereon. The tape 31 extends out of the supply reel 28 and around a first guide means 32 located adjacent the supply reel 28. The guide means 32 forms a cylindrical race-way made of plastic or mylar material. A pressure finger 33 is located adjacent the first guide means 32 and is spring biased by a spring 34 to maintain the tape 31 in tension therebetween. The tape 31 then extends toward the rearward wall 25.

The rearward wall 25 comprises a plurality of projections 35, 36, 37 and 38 with a first cavity 39 defined between projections 35 and 36, a second cavity 40 defined between projections 36 and 37, and a third cavity 41 defined between projections 37 and 38. The first and third cavities 39 and 41 are adapted to receive a pair of rotating capstans 42 and 43 while the second cavity 40 is adapted to receive a magnetic head assembly 44. It should be noted that the capstans 42 and 43 extend completely across the rearward end of the transport assembly 12 to be insertable within each of the cavities 39 and 41 of each tape cartridge 14. The magnetic head assembly 44 includes a plurality of magnetic heads which also extends across the rearward end of the transport assembly 12 to be insertable within the cavity 40 of each tape cartridge 14. A plurality of guides 45, 46, 47 and 48 are located within the respective projections 35, 36, 37 and 38. Openings are also formed within the walls of the projections to permit the tape 31 to extend around the guide means and across the cavities 39, 40 and 41 to expose the tape 31 to the rotating capstans 42 and 43 and magnetic head assembly 44. Shown in its operating position, the tape cartridge 14 is moved rearwardly until the magnetic tape 31 extends around the capstans 42 and 43 and is frictionally driven thereby. A leaf spring 49 is integrally connected to the guide means 47 and is arcuately shaped to extend across the cavity 40 for biasing the magnetic tape 31 against the capstan 43. In the operating position the magnetic head assembly extends into the second cavity 40 to frictionally engage the magnetic tape 31 in the conventional manner. In completing the circuit, the tape 31 extends around the guide 48 to a guide 51 and then on to the take-up reel 30. It is noted that all of the guide means engage the magnetic tape on the non-recording side, eliminating the possibility of the recording side of the tape being damaged by a worn guide.

As shown, the cartridge 14 is maintained in its operating position by means of a latch assembly 52. The latch assembly 52 includes a pawl 53 which is insertable within a slot 54 formed within the bottom wall 23. The description of the latch assembly 52 will be given in greater detail hereinafter with reference to FIG. 3.

During the recording cycle the take-up reel 30 is driven at its periphery by means of a puck assembly 60 in order to take up the tape fed by the capstan drive. The puck assembly 60 includes a leg 61 pivotally connected about a shaft 62. A drive wheel 63 is rotatably connected to the free end of the leg 61 and is adapted to engage the periphery of the take-up reel 30. To drive the take-up reel 30, the leg 61 is pivoted toward the take-up reel 30 by means of prongs 64, which are connected to the latch assembly 52, until the drive wheel 63 engages the periphery of the take-up reel 30. The drive wheel 63 is then rotatably driven by belt means, not shown, in the conventional manner. When the recording cycle is completed the latch assembly 52 pivots the pawl 53 away from the capstans 42 and 43 to move the tape cartridge 14 to disengage the tape 31 from the capstans 42 and 43 and the magnetic head assembly 44. The prongs 64 are also pivoted away from the leg 61 thereby permitting the leg 61 to be drawn toward the supply reel 28 by means of a spring 65.

During the rewind cycle the supply reel 28 is driven in the reverse direction by means of a rewind puck assembly 66, which includes a leg 67 which is also pivotally mounted about a shaft 68. A drive wheel 69 is pivotally mounted about the other end of the leg 67 and is adapted to frictionally engage the periphery of the supply reel 28. To initiate the rewinding cycle, the leg 67 is pivoted downwardly by means of a solenoid 70. The drive wheel 69 is likewise rotatably driven by belt means, not shown, in the conventional manner. Upon completion of the rewinding cycle the solenoid 70 is deactivated and the leg 67 is drawn away from the supply reel 28 by means of a spring 71.

It is noted that during the recording and rewinding cycles, the reels 28 and 30 are permitted to freely rotate. However, when the puck assemblies 60 and 66 are not operating, the reels 28 and 30 are frictionally locked in position by means of a brake assembly 72. Such means firmly secure the reels 28 and 30 within the cartridge 14 when the cartridge 14 is removed from the tape transport assembly 12. The brake assembly 72 includes a pair of arms 73 pivotally connected to the side wall 21. A shoe 74 is integrally formed at the end of each of the arms 73 with a friction pad 75 located therein. The arms 73 also includes projections 76 extending upwardly therefrom and are drawn together by means of a spring 77 which in turn biases the arms 73 against the peripheries of the reels. To overcome the spring force and disengage the friction pads 75 from the periphery of the reels 28 and 30, a trigger mechanism 78 is provided to engage a pair of extensions 79 each of which is also integrally connected to an arm 73. The trigger mechanism 78 is secured to the side wall 21 and is permitted to move along a slot 80 formed therein. The trigger mechanism 78 includes two lever arms 81 and 82 which extend through openings 83 and 84 formed in the bottom wall 23. The trigger mechanism 67 is held in its lower position by the spring means 77 with the lever arms having a pair of projections 85 engaging a pair of catches 86 and 87 formed on the bottom wall 21. The portion of the lever arms 81 and 82 that extend through the openings 83 and 84 respectively are adapted to engage a pair of rollers 88 and 89 located on the legs 61 and 66.

During the recording cycle as the leg 61 moves upwardly it engages the lever arm 81 to pivot the trigger mechanism about the catch 86. This, in turn, moves the extensions 79 upward, which causes the arms 73 to move downward thereby disengaging the friction pads 75 from contact with the reels.

Likewise during the rewinding cycle as the leg 66 moves upwardly, it engages the lever arm 82 to pivot the trigger mechanism about the catch 87. Such a movement again causes the trigger mechanism to disengage the friction pads 75 from the reels 28 and 30 in the manner described above.

It should be noted that the shafts 62 and 68 extend completely across the transport assembly 12 with each shaft rotatably supporting four of the respective puck assemblies.

Means are also provided to monitor the amount of magnetic tape 31 wound on each supply reel 28. Such a means is defined by a photo sensor 90 located adjacent the bottom wall 23 of each tape cartridge 14. A light bulb 91 is located adjacent the top wall 22 of each tape cartridge 14 to provide a source of light for the respective sensors 90. A pair of orifices 92 and 93 are defined within the top and bottom walls 22 and 23 of each tape cartridge 14 and are positioned in such a manner that they provide an optical path therebetween such that when the tape 31 is unwound from the supply reel 28 sufficiently, a light beam from the bulb 91 is projected therethrough. The photo sensor 90 is then actuated to relay this information to the logic system of the recorder 10.

Figure 3:
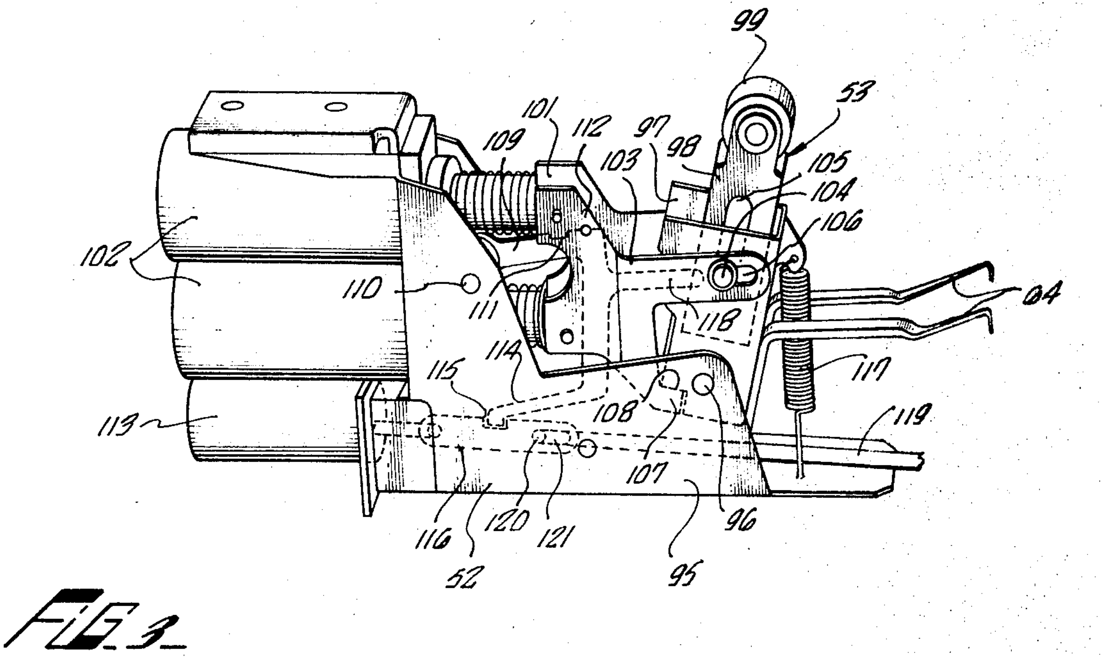
FIG. 3 is a perspective view of one of the latch mechanisms located within the tape transport assembly.

FIG. 3 shows in greater detail the construction of the latch assembly 52. As stated previously the pawl 53 is pivotally mounted on a bracket 95 by pin means 96. The pawl 53 is of a two-piece construction which includes an outer housing 97 which is pivotally mounted to the bracket 95 and a piston 98 which is reciprocally movable therein. The upper end of the piston 98 includes a roller 99 journaled thereon which is insertable within the slot 54 formed in the tape cartridge 14. It should be noted that the projection 38 of the tape cartridge 14 is rounded (see FIG. 2) to permit that end of the tape cartridge 14 to engage the roller 99 and retracts the piston 98 until the slot 54 reaches the roller 99. At that time the piston 98 again is extended with the roller 99 extending into the slot 54. A spring, not shown, biases the piston 98 upwardly at all times.

In the position shown in FIG. 3 the pawl 53 is pivoted in its forward position. In this position the tape cartridge is in its ready position, being held a slight distance from the rotating capstans 42 and 43 and the magnetic head assembly 44. In this location the exposed portion of the magnetic tape 31 is out of engagement with the capstan and magnetic head assemblies. When it is desired to move the exposed portions of the tape 31 into engagement with the capstan and magnetic head assemblies the pawl 53 is pivoted rearwardly until the tape cartridge 14 reaches the position shown in FIG. 2. This pivoting movement is carried out by means of a linkage 101 which is connected to a pair of solenoids 102. The other end of the linkage 101 is connected to the outer housing 97 at two locations. The first connection is formed by an extension 103 extending around the upper portion of the outer housing 97 and is pivotally connected thereto by means of a pin 104. The pin 104 extends through a pair of slots 105 located in the piston 98 and is also journaled in a pair of slots 106 formed in the extensions 103. A bottom flange 107 is also formed at the lower end of the linkage 101 and is adapted to engage a corner 108 formed at the lower part of the outer housing 97. In operation, upon activation, the solenoids 102 drive the linkage 101 rearwardly, Initially, the extension 103 does not affect the pawl 53 since the pin 104 rides within the slot 106. However, during this initial movement, the projection 107 moves away from the corner 108 of the outer housing 97 to permit the pawl 53 to freely rotate about the pin means 96. Upon further movement rearwardly, the forward end of the slot 106 engages the pin 104 to pivot the pawl 53 rearwardly, thus moving the tape cartridge 14 rearwardly into the recording position. The solenoids 102 are activated only a short time. At the rearward most point of travel, the pawl 53, along with the linkage 101, is locked in that position by means of a locking arm 109. The locking arm 109 is pivotally mounted on the brackets 95 by pin means 110. A portion of the locking arm 109 includes a hook portion 111 which is adapted to engage a bar 112 which is rigidly attached to the linkage 101. Upon securing the pawl 53 and linkage 101 to the locking arm 109 the solenoids 102 are deactivated. After the recording cycle, and when it is desired to pivot the pawl rearwardly to disengage the tape cartridge 14 from the capstans 42 and 43 and the magnetic head assembly 44, the locking arm 109 is pivoted downwardly by means of a solenoid 113 to disengage the hook 111 from the bar 112. This is done by means of a leg 114 extending downwardly from the locking arm 109 and having its lower portion extending into a slot 115 formed on a connecting bar 116. The rearward end of the connecting bar 116 is connected to the solenoid 113. In operation when the solenoid 113 is activated it drives the connecting bar 116 rearwardly which, through the leg 114, pivots the locking arm 109 downwardly, thereby disengaging the hook 111 from the bar 112. This frees the linkage 101 to enable the pawl 53 to be pivoted forwardly. The pawl 53 is driven in such a direction by means of a spring 117 which is connected to the outer housing 97 and also the brackets 95.

The arm 109 also has an extension 118 which extends into the piston 98. This is to enable the piston to be retracted by means of the extension 118 upon a further downward movement of the locking arm 109. This is done when it is necessary to withdraw the roller 99 from the slot 54 to enable the cartridge 114 to be withdrawn from the tape transport assembly 12. Such an operation is carried out by means of a rod 119 that is connected at its forward end to a release button 20 and its rearward end to the connecting bar 116 by means of a pin 120. The pin 120 is located within the slot 121. Since the pin 120 is initially located at the rearward end of the slot 121, the rod 119 and the release button 20 are not affected by the initial movement of the connecting bar 116. In operation, if it were desired to retract piston 98 in order to disengage the roller 99 from the tape cartridge 14, the release button 20 would be pushed inwardly to force the rod 119 rearwardly. The rod 119 and its pin means 120 would travel rearwardly until the pin 120 engages the rearward end of the slot 121 to move the connecting bar 116 further in the rearward direction. This additional movement causes the leg 114 to pivot the locking arm 109 downwardly which in turn, through its extension 118, retracts the piston 98 downwardly.

As can be seen by the various operations of the tape transport assembly, any of the tape cartridges can perform various functions, with the sequence of the operations being controlled by a logic system that is not part of the invention. The important feature of the tape transport assembly is that it is able to utilize a plurality of tape cartridges and sequentially operate them; thereby providing up to twenty-four hours of uninterrupted recording time.

Another important feature is the cooperation of the various elements of the assembly. Since the latch means control both the cartridge position and the take-up puck assembly, the tape cartridge can be removed at any time, including during the recording cycle, except during the rewinding cycle. A stop assembly (not shown) is connected to the rewind puck assembly and is utilized to engage the rod 119 during the rewinding cycle to prevent the rod 119 from traveleing rearwardly during such a cycle.

What is claimed is:

1. A tape transport assembly for receiving a plurality of tape cartridges having guide means for exposing magnetic tape at one end of the cartridge comprising:

a rectangular compartment being open at the forward end for receiving the tape cartridges, the rearward end of said compartment including a pair of elongated rotating capstans extending across said compartments, and a magnetic head assembly located between said capstans;

a plurality of latch means extending across said compartment, each latch means engaging a registering tape cartridge, means for actuating said latch means for moving the respective tape cartridge toward the rearward end of said compartment to enable the exposed portion of said tape to be brought into frictional engagement with said rotating capstans and said magnetic head assembly.

2. The invention in accordance with claim 1 wherein:

each latch means comprises a pawl pivotally mounted at one end with the other end adapted to engage the respective tape cartridge; and said actuating means comprises a servo mechanism connected to said pawl for pivoting said pawl toward the rearward end of said compartment.

3. The invention in accordance with claim 2 wherein each of said latch means further includes locking means for locking said pawl in a position in which the exposed tape engages the capstan and magnetic head means comprising an arm pivotally connected to the housing of said latch means, said arm further comprising a hook portion for engagement with said latch means on said pawl for maintaining said pawl in the locked position.

4. The invention in accordance with claim 3 wherein each of said locking means further includes a servo mechanism for pivoting said arm to disengage it from said catch thereby enabling said pawl to move away from the rearward end of said compartment.

5. The invention in accordance with claim 3 wherein each of said pawls includes a hollow housing pivotally mounted at one end with a piston member axially movable within said hollow housing, the outer end of said piston member engaging a registering tape cartridge.

6. The invention is accordance with claim 5 wherein each of said arms of said locking means is further connected to said respective piston member to retract said piston member within said hollow housing thereby disengaging said piston member from said tape cartridge.

7. The invention in accordance with claim 6 further including a rod connected to reach of said arms and extending to the forward end of said tape transport assembly and being reciprocable therein to provide a manual disengagement of said tape cartridge.

8. The invention in accordance with claim 2 further comprising:

a shaft extending across said compartment; a plurality of take-up puck assemblies, each take-up puck assembly including an arm having one end pivotally connected to said shaft, and the other end having a pulley rotatably journaled thereon, and prong means connected to each of said pawls adapted to engage one of said pulleys whereby upon a rearward pivot of each of said pawls, said respective prong means moves said engaging pulley into engagement with the periphery of the take-up reels of a registering tape cartridge.

9. The invention in accordance with claim 1 further including means on said tape transport assembly to monitor the amount of magnetic tape wound on the supply reels.

10. The invention in accordance with claim 9 wherein said monitoring means includes:

a plurality of light sources, each light source being located adjacent one side of the tape cartridges; and a plurality of photo-sensors, each photo-sensor being located adjacent the opposite side of the tape cartridge, each of said light sources and said photo-sensor being positioned to describe a straight line cutting across the supply reel tangential to the hub thereof, whereby a light beam from said light source is transmitted to said photo-sensor when the tape is substantially removed from the supply reel.

11. The invention in accordance with claim 1 further comprising:

a shaft extending across said compartment;

a plurality of rewind puck assemblies, each rewind puck assembly including an arm having one end pivotally connected to said shaft, the other end having a pulley rotatably journaled thereon, and means for pivoting each of said arms to move said respective pulleys into engagement with the periphery of the supply reel of a registering tape cartridge.

* * * * *